Feb. 5, 1963 L. H. DEHNER 3,076,879
INTENTIONAL ACTUATION ASSURING DEVICE
Filed Jan. 12, 1960 2 Sheets-Sheet 1
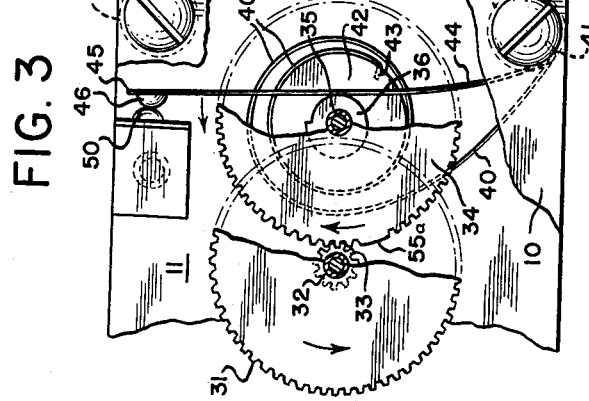
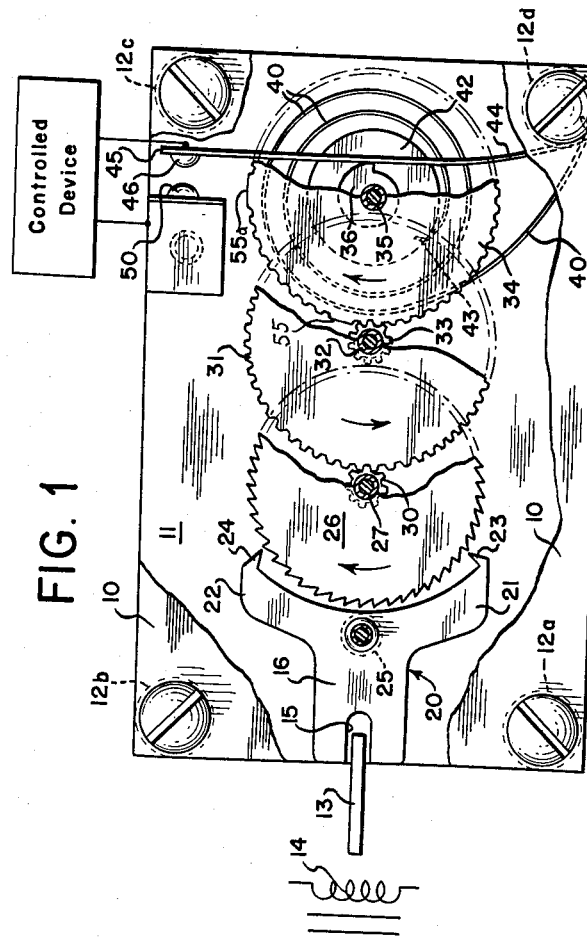
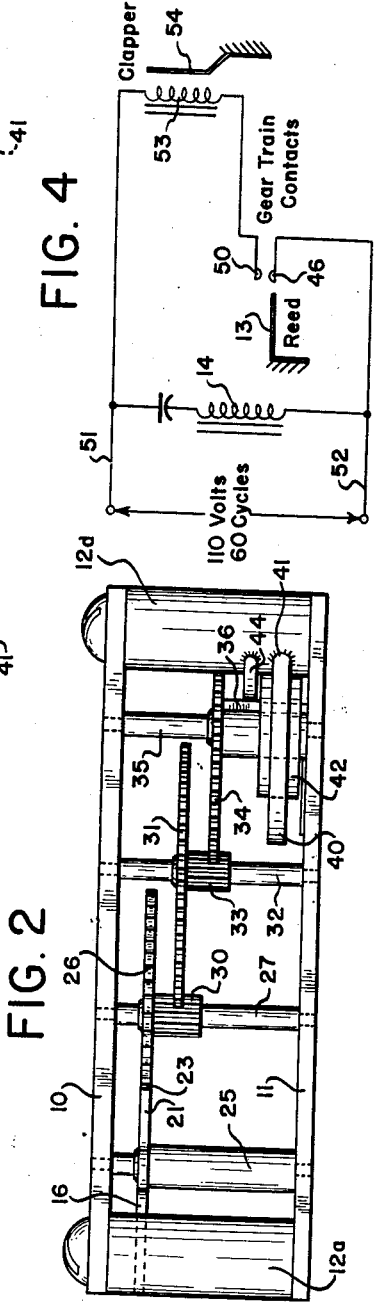
INVENTOR
Lester H. Dehner
BY
*Burton Perlman*
ATTORNEY Feb. 5, 1963 L. H. DEHNER 3,076,879
INTENTIONAL ACTUATION ASSURING DEVICE
Filed Jan. 12, 1960 2 Sheets-Sheet 2

INVENTOR
Lester H. Dehner
BY
*Burton Perlman*
ATTORNEY

United States Patent Office 3,076,879
Patented Feb. 5, 1963

3,076,879
INTENTIONAL ACTUATION ASSURING DEVICE
Lester H. Dehner, Cincinnati, Ohio, assignor to KDI Corporation, Cincinnati, Ohio, a corporation of Delaware
Filed Jan. 12, 1960, Ser. No. 2,025
13 Claims. (Cl. 200—105)

This invention relates to a mechanism for the actuation of a controlled device by remote control, and more particularly to such a mechanism which, while being responsive to electrical impulses of a predetermined cyclic frequency, will yet not trigger the controlled device if a particular transmission of the predetermined frequency is but transient.

It is known to use a frequency responsive reed in various applications, and an electrical circuit for affecting such reed from a remote location. The operation of such a known frequency responsive, or tuned, reed, depends upon the fact that a magnetic field will arise in the vicinity of a coil upon passage of an electric current therethrough. The polarity of the field will reverse with cyclic transmission of electric current, that is, with an alternating current. The reed, being of magnetic material, will be alternately attracted and repelled as the polarity of the magnetic field reverses, but resonant vibration of the tuned reed will only occur when the cyclic period of alternation of the electric current is the same as the resonant frequency of the tuned reed. The attribute which lends special utility to this expedient is that complete selectivity is possible. Vibration in the reed will be caused only upon transmission through the line of electrical impulses of the particular cyclic frequency to which the reed is tuned (hereafter referred to as the selected frequency). Thus, other frequencies may be carried by the line for other purposes, but only upon transmission of the selected frequency will a result be produced in the reed.

In practice, however, a problem arises where a tuned reed is used and the electrical line powering it is in general service. Such a power line will be in contact with many different kinds of electrical installations and the operation of some of these installations can cause very brief, or transient, transmissions of the selected frequency. Where this can occur, obviously the virtue of the tuned reed responsive only to the selected frequency, is destroyed, for the reed can be set into vibration when it is not the intention to do so. The problem referred to, then, is how to make it possible to utilize a tuned reed even where there is a danger of unintentional vibration of the reed by transient impulses.

It is the primary object of this invention to provide means whereby a controlled device operable through a general service power line and a tuned reed cannot be unintentionally actuated by transient electrical impulses, but will be actuated only when it is the intention to do so. Essentially, this primary object is implemented by the interposition of a unique mechanical train between the tuned reed and the controlled device. Only after the mechanical train has been driven for an appreciable length of time will the controlled device be actuated. This rules out the possibility of accidental actuation by transient impulses.

As an example of the utility of the expedient which is under consideration, a community warning system readily suggests itself. Most communities have at hand a network of power lines leading into virtually every building within the community. Plugging a simple device embodying the principles of the present invention into the power line in every such building provides a community-wide warning system, when the device plugged in contains auditory and/or visual alarm means operable through a tuned reed. In such an installation the auditory and/or visual alarm means is what is meant by the term "controlled device."

It is another very important object of this invention that by use thereof, the degree of advance of the mechanical train interposed between the tuned reed and the controlled device will be independent of the voltage in the line affecting the reed, and dependent strictly upon the duration of transmission of selected frequency. That is, the mechanical train will be advanced to the same extent regardless of voltage, so long as a transmission of electrical impulses of selected frequency persists. This is important because the amplitude of vibration of the reed can vary with voltage, but the present invention eliminates such variation as a factor affecting the period during which the transmission must persist before the controlled device is actuated.

Another object herein is to provide for automatic reset in the event that only a transient impulse of the selected frequency is received. Upon receipt of any impulse of the selected frequency, the presently disclosed structure will commence operation. If the transmission is intentional, it will persist long enough so that the controlled device will be actuated. But if the transmission is unintentional, it will be brief and cease before the controlled device is actuated. Where this occurs, the mechanism of the present invention will automatically return to its zero position.

Still another object of this invention is to permit use of either or both audible or visual signals as may be found most desirable under the circumstances.

It is still another object of this invention to provide a mechanism which can be so regulated that in order to actuate the controlled device the transmission of selected frequency may be of greater or lesser duration as desired.

How these and many other objects are to be implemented will become clear through a consideration of the accompanying drawings wherein:

FIG. 1 is a plan view, partly broken away, of mechanism embodying the present invention, the mechanism being in starting position;

FIG. 2 is an elevational view of the embodiment seen in FIG. 1;

FIG. 3 is a partial plan view of the same mechanism seen in FIG. 1, operation of the mechanism in this view having proceeded to a stage where the controlled device is actuated;

FIG. 4 is a circuit diagram for a device as illustrated in the remaining drawings, the "controlled device" here being shown as an audible alarm in which a clapper sounds.

Figure 5:
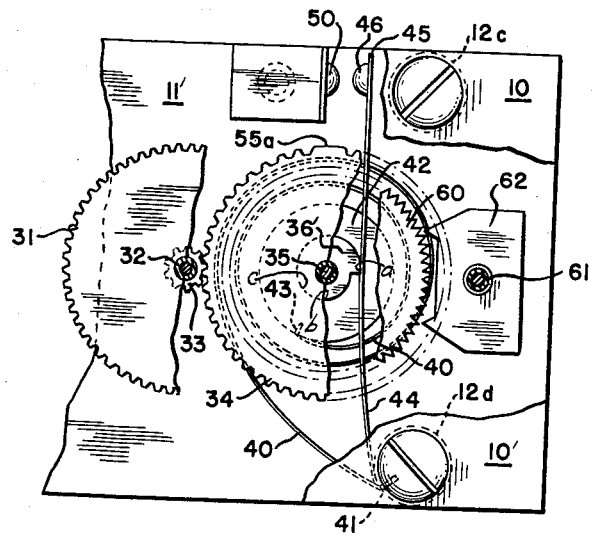
FIG. 5 is a plan view of a portion of the device seen in the preceding figures, with structural modifications to permit an extension of the period of activation of the controlled device.

The mechanism shown in the drawings is carried between a top support plate 10 and a bottom support plate 11 which are spaced apart by four pillars, 12a, 12b, 12c, and 12d. Reed 13 and coil 14 which drives it are shown schematically since they are of known construction.

Reed 13 is in position to operate the controlling mechanism because it is disposed within notch 15 in the shank portion 16 of lever 20. The lever 20 also has a pair of substantially oppositely extending arms 21 and 22, at the end of each of which there is a detent 23 and 24 respectively. The lever 20 is pivotally mounted atop staff 25 which is supported between the top support plate and the bottom support plate 10 and 11 respectively. The detents 23 and 24 are so disposed that upon pivoting motion of the lever arm, the detents will rotatably drive a ratchet wheel 26. The ratchet wheel 26 is mounted upon a shaft 27 which shaft 27 in turn is mounted for rotation in the support plates 10 and 11 respectively. Also mounted for rotation on the shaft 27 is a pinion 30.

When detents 23 and 24 now drive the ratchet wheel 26, shaft 27, and pinion 30, such motion in turn drives a gear 31 which gear has teeth in contact with pinion 30. Gear 31 is mounted upon a second shaft 32 and there is a pinion 33 also mounted upon said shaft. Shaft 32 again is supported between the support plates 10 and 11 for rotation.

Another gear 34 has teeth in contact with pinion 33, and in this manner a third shaft 35 is rotatably driven since the gear 34 is mounted upon the third shaft 35. Also mounted upon shaft 35 is a cam 36, which serves as the ultimate control means for the controlled device. There is a hairspring 40 having one end pinned or soldered in known manner to pillar 12d at 41. The other end of hairspring 40 is secured to the surface of hub 42 at point 43. Hub 42 is also mounted on shaft 35 for rotation therewith.

Leaf spring 44 is fastened at one end to pillar 12d and is so disposed that it bears upon cam 36. At the free end 45 of leaf spring 44 is a contact point 46 which, when brought into contact with a second contact point 50 can actuate the circuit of a controlled device. The second contact point 50 is immovably fastened to the bottom support plate 11. Together, the leaf spring 44 and contact points 46 and 50 provide switch means for the controlled device.

In FIG. 4 is shown a schematic diagram of the electrical circuit including control mechanism and a controlled device, in this case an audible signal. Thus, incoming power lines 51 and 52 normally carry 110 volt 60 cycle power. Coil 14 is tied into this power line and is contiguous to reed 13. Upon the sending of electrical impulses of selected cyclic frequency through the power line, the electric impulses go through coil 14 and reed 13 will be set into vibration. Upon continuance of the transmission of selected frequency for sufficient time which would only occur upon intentional transmission, contact points 46 and 50 will be brought together whereupon a second coil 53 is actuated to start the sounding of a clapper 54.

Operation of the control mechanism can be readily understood from the foregoing description, but the following will serve to illuminate that description. When a transmission of selected cyclic frequency is sent out over power lines 51 and 52, reed 13 under the influence of the magnetic field of coil 14 begins to vibrate. Vibration causes lever 20 to pivot upon the staff 25, and such pivoting motion in turn drives the ratchet wheel 26. It will be readily appreciated that the interposition of the second shaft 32 bearing gear 31 and the second pinion 33 functions as part of a speed reduction gear train. That is, cam 36 could be mounted directly upon the first shaft 27, but in this case it would rotate at a very rapid rate as does the first shaft 27. However, by interposing the second shaft 32 and the pinion and gear elements 30, 33, 31, and 34, the cam 36 will rotate at a considerably slower rate in response to the vibration of reed 13.

As seen in FIG. 1, the cam 36 is in its starting position, in which position it supports the leaf spring 44 with contact point 46 out of contact with the stationary contact point 50, i.e. with switch open. In order for the contact points 46 and 50 to be brought together, i.e. the switch to close, the cam 36 must be rotated in the direction indicated in FIG. 1, there seen to be clockwise, for long enough so that it will reach its terminal position as shown in FIG. 3. If the transmission of selected frequency is only transient, it will cease before the cam is rotated to such terminal position. When the reed 13 stops vibrating upon the passage of any such transient impulse, the lever 20 will center itself with the detents 23 and 24 out of contact with the ratchet wheel 26. When this occurs, hairspring 40 will function to unwind the mechanism so that cam 36 will be returned to its starting position as seen in FIG. 1. The hairspring 40 will perform this unwinding function because of the build-up of energy therein when such hairspring is wound up during the rotation of shaft 35 and cam 36. Blank portion 55 where teeth are omitted from gear 34 serves to stop cam 36 in starting position upon such unwinding.

But if the transmission of selected frequency is an intentional signal, reed 13 will continue to vibrate and rotatably drive cam 36 through the gear train already referred to, until the cam reaches the terminal position seen in FIG. 3. As seen in FIG. 3, when cam 36 has reached terminal position, blank portion 55a in gear 34 where teeth are omitted from such gear has reached pinion 33. Upon this occurrence, pinion 33 cannot drive gear 34 any further. Moreover, the switch will be closed and the control device will be actuated. This condition will persist so long as the reed continues to vibrate. However, upon cessation of vibration of the reed, hairspring 40 will function as in the case of a transient impulse to open the switch and return the control mechanism to its starting position, causing operation of the controlled device to cease.

Figure 6:
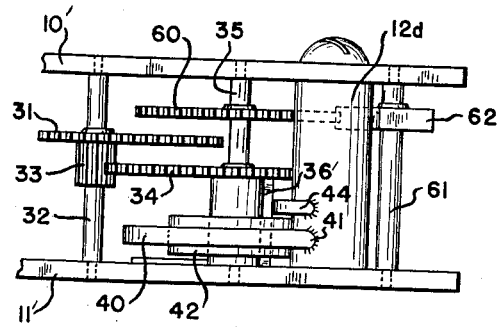
FIG. 6 is an elevational view of the modification of FIG. 5.

In FIGS. 5 and 6 is shown a modification of the device heretofore illustrated in FIGS. 1-4 and described in connection therewith. Elements in FIGS. 5 and 6 similar to those in FIGS. 1-4 bear the same identifying numbers. The purpose of such modification is to cause a brief time delay during which the controlled device continues to be operative even after the intentional transmission of selected frequency ceases, and the reed 13 ceases vibrating. This is accomplished by constructing the cam 36 as hereafter described and additionally mounting star wheel 60 on shaft 35. A fourth shaft 61 is pivotally mounted between top and bottom support plates 10' and 11' respectively, which plates in FIGS. 5 and 6 are shown extended to accommodate shaft 61. Mounted upon shaft 61 is pallet 62 which can engage the teeth of star wheel 60.

The way in which the components described in the preceding paragraph function to achieve the desired objective of time delay is as follows. Cam 36' is so designed that its terminal position as seen in FIG. 3 is not the position of first contact between contact points 46 and 50. Rather does the cam react with leaf spring 44 so that the contact points make electrical contact, i.e. the switch closes, a brief period before the terminal position (FIG. 3) of cam 36' is reached. That is, cam 36' has a point of maximum radius, "a." The cam 36' is in starting position when point "a" abuts against leaf spring 44 and the switch is open. The peripheral surface of cam 36' diminishes in radius to point "b," and when point "b" abuts against leaf spring 44, the cam is said to be in terminal position, and the switch is closed with the controlled device operating. However, the terminal position of cam 36' does not determine the first instant when contact points 46 and 50 make contact. Rather is the switch first closed when a point, as "c," lying between "a" and "b" on the peripheral surface of cam 36' reaches abutment with leaf spring 44.

When subsequently the reed 13 ceases vibrating and shaft 35 under the impetus of hair spring 40 returns cam 36' counterclockwise in the drawings toward starting position, contact between contact points 46 and 50 will not instantaneously be broken. Such contact points will remain closed during the period that the portion of peripheral surface of cam 36' between points "b" and "c" abuts against leaf spring 44. The interposition of the cooperating star wheel 60 and pallet 62, then, will serve to extend the brief period in which the said contact points maintain electrical contact after cessation of vibration of the reed. This extension of time occurs because the pallet 62, through a slipping engagement with star wheel 60 causes a drag upon rotation of shaft 35 as such shaft unwinds. During this brief period the controlled device will continue to operate despite cessation of vibration of the reed, and cessation of any transmission of selected frequency.

While I have described specific embodiments of my invention it is apparent that changes and modifications may be made therein, and despite such alterations, the resulting structure will still fall within the ambit of my invention.

I claim:

1. A mechanism for the intentional actuation from a remote position of a controlled device, comprising coil means in which a magnetic field of reversing polarity can arise upon passage of an alternating electric current therethrough, a reed mounted adjacent said coil means, said reed being vibratable upon the passage through said coil means of electrical impulses of selected frequency to which said reed is tuned, a lever having a pair of arms, said lever being engageable by said reed, a detent disposed terminally on each of said arms, said lever being mounted to pivot reciprocally with vibration of said reed, a ratchet wheel mounted for rotation having teeth engageable by said detents, said ratchet wheel being rotatable by said detents upon vibration of said reed, a cam rotatable in response to rotation of said ratchet wheel, switch means for said controlled device in contact with said cam, and automatic reset means for returning said cam toward starting position upon cessation of transmission of electrical impulses of selected frequency, said cam having a surface extending from a starting to a terminal position of said cam, said switch means being open when in contact with said cam at starting position and closed when in contact with said cam at terminal position, said switch first closing when said switch means is in contact with said cam at a third position on the surface of said cam between said starting and terminal positions, said switch means being closed when in contact with said cam between said third position and said terminal position.

2. A mechanism as claimed in claim 1 including drag means to hinder rotation of said cam when said automatic reset means returns said cam toward starting position, whereby the period can be extended during which said switch means will remain closed after said cam reaches terminal position and said transmission of selected frequency ceases.

3. A mechanism as claimed in claim 1 including a shaft upon which said cam is mounted for rotation therewith, a star wheel also mounted upon said shaft for rotation therewith, another shaft, a pallet mounted for pivoting motion on said other shaft, said pallet being in engagement with said star wheel, whereby the period can be extended during which said switch means will remain closed after said cam reaches terminal position and said transmission of selected frequency ceases.

4. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, and means interposed between said ratchet wheel and said cam whereby said controlled device will be actuated only after the sustained passage through said coil means of said electrical current of said frequency.

5. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, and means interposed between said ratchet wheel and said cam whereby said controlled device will be actuated only after the sustained passage through said coil means of said electrical current of said frequency, and including a speed reduction gear train in engagement with said ratchet wheel and said cam, whereby said cam will rotate at a slower rate than said ratchet wheel.

6. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, whereby said controlled device will be actuated only after the sustained passage through said coil means of said electrical current of said frequency, and wherein said ratchet wheel is mounted on a first shaft for rotation therewith, said cam is mounted on a second shaft for rotation therewith, and including a pinion mounted on said first shaft for rotation therewith and a gear mounted on said second shaft for rotation therewith, said gear and therefore said cam being rotatably driven upon rotation of said pinion, whereby said gear and said cam will rotate at a slower rate than said ratchet wheel.

7. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, whereby said controlled device will be actuated only after the sustained passage through said coil means of said electrical current of said frequency, and wherein said cam has a starting position, and including automatic reset means for returning said cam to starting position upon cessation of vibration of said reed.

8. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, whereby said controlled device will be actuated only after the sustained passage through said coil means of said electrical current of said frequency, and wherein said cam has a starting position, and including stop means for retaining said cam in said starting position, a hairspring fixedly mounted at one end and having its other end mounted to rotate with said cam so that tension in said hairspring will increase with rotation of said reed, and said hairspring will automatically return said cam to starting position when vibration of said reed ceases, said stop means retaining said cam in starting position after such automatic return.

9. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, whereby said controlled device will be actuated only after the sustained passage through said coil means of said electrical current of said frequency, and including a gear drivable by said ratchet wheel, a rotatable shaft upon which said gear and said cam are mounted for rotation therewith, said gear having at least one tooth absent to determine a starting position for said cam, and a hairspring fixedly mounted at one end and having its other end mounted to rotate with said cam so that tension in said hairspring will increase with rotation of said cam when such rotation is caused by vibration of said reed whereby said hairspring will automatically return said cam to starting position when vibration of said reed ceases, said stop means retaining said cam in starting position after such automatic return.

10. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, whereby said controlled device will be actuated only after the sustained passage through said coil means of said electrical current of said frequency, and including a gear drivable by said ratchet wheel, a rotatable shaft upon which said gear and said cam are mounted for rotation therewith, said gear having at least one tooth absent to determine a terminal actuating position for said cam, whereby said cam will cease rotation after reaching said terminal actuating position.

11. A mechanism for the intentional actuation from a remote position of a controlled device only in response to a sufficiently sustained application of electrical current of predetermined frequency, comprising coil means in which a magnetic field of reversing polarity can arise upon passage of an alternating current therethrough, a reed resonant to said frequency mounted adjacent to said coil means, said resonant reed being vibratable at said predetermined frequency upon the passage through said coil means of said electrical current, a lever having a pair of arms, said lever and arms being actuatable by said reed, a detent disposed terminally on each of said arms, a ratchet wheel mounted for rotation in response to actuation of said detents, said ratchet wheel being rotatable by said detents only upon vibration of said reed, a cam rotatably drivable by said ratchet wheel, switch means for actuating said controlled device operated by said cam only after predetermined rotation of said cam, and means interposed between said ratchet wheel whereby said controlled device will be actuated only after the sustained passage through said coil means of said electrical current of said frequency, and wherein said switch means comprises a leaf spring fixedly mounted at one end and in bearing contact with said cam, a contact point at the other end of said leaf spring, and a second contact point fixedly mounted.

12. A mechanism for the intentional actuation from a remote position of a controlled device only after application of a predetermined plurality of cycles of alternating current of predetermined frequency, comprising a source of sustained alternating electric current of said frequency, coil means in which an alternating magnetic field arises upon passage of said alternating current therethrough, means interconnecting said coil means and said source, a resonant magnetic reed mounted adjacent said coil means, said reed being resonant to said frequency and vibratable only in response to the passage through said coil means of said alternating current of said frequency, a rotary device, means operable by said reed for transforming continued vibrating motion of said reed to continued rotary motion of said rotary device in a single direction, a cam operable for the actuation of said controlled device, and means interposed between said rotary device and said cam whereby said controlled device will be actuated only after the sustained passage through said coil means of said alternating current.

13. The combination according to claim 12 wherein said rotary device is an escapement mechanism.

References Cited in the file of this patent

UNITED STATES PATENTS

| | | |
|---|---|---|
| 1,828,507 | Murphy | Oct. 20, 1931 |
| 2,578,347 | Gagnaire | Dec. 11, 1951 |
| 2,699,493 | McCullough | Jan. 11, 1955 |
| 2,867,795 | Longton | Jan. 6, 1959 |
| 2,906,838 | Deighton | Sept. 29, 1959 |
| 2,968,801 | De Feo | Jan. 17, 1961 |

FOREIGN PATENTS

| | | |
|---|---|---|
| 957,751 | France | Aug. 29, 1949 |